United States Patent

Evans

[15] 3,674,871

[45] July 4, 1972

[54] ANTI-INFLAMMATORY METHOD

[72] Inventor: Delme Evans, Sandhurst, Berkshire, England

[73] Assignee: Lilly Industries, Ltd., London, England

[22] Filed: Oct. 5, 1970

[21] Appl. No.: 78,146

[30] Foreign Application Priority Data

Oct. 7, 1969  Great Britain ............... 49,196/69

[52] U.S. Cl. .................................................. 424/270
[51] Int. Cl. ............................................... A61k 27/00
[58] Field of Search ...................................... 424/270

[56] References Cited

OTHER PUBLICATIONS

Chemical Abstracts 48:10738e (1954)

Chemical Abstracts 48:10739a (1954)

Primary Examiner—Jerome D. Goldberg
Attorney—Everet F. Smith and Walter E. Buting

[57] ABSTRACT

A method for treating inflammation in warm-blooded mammals comprising administering at a daily dose between 10 and 450 mg./kg. of body weight a 2-acylamino-4-(alkoxyalky or alkylthioalkyl)thiazone of the formula

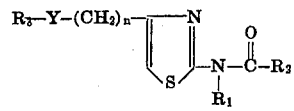

wherein $R_1$ and $R_2$ are H or $C_1$-$C_6$ alkyl, $R_3$ is $C_1$-$C_6$ alkyl, Y is —O—, —S—, —SO— or —$SO_2$— and $n$ is 1–4 and the pharmaceutically acceptable salts thereof.

4 Claims, No Drawings

1

ANTI-INFLAMMATORY METHOD

BACKGROUND OF THE INVENTION

A number of anti-inflammatory agents have been developed and used in the treatment of such conditions as rheumatoid arthritis and various conditions of the skin and other body tissues which are characterized by inflammation, swelling, soreness, pain and fever. Many such conditions are chronic while others are temporary in that they result from trauma or infection of body tissues. While the currently used anti-inflammatory agents have proved efficacious in a number of inflammatory conditions, rarely do they afford relief without accompanying side-reactions nor do they control all inflammatory conditions.

The search for more highly effective anti-inflammatory agents with less side reactions therefore continues.

The present invention provides a method for controlling inflammation in warm-blooded mammals which comprises administering an effective non-toxic dose of a 4-alkylether or 4-alkylthio ether derivative of a 2-acylaminothiazole.

SUMMARY OF THE INVENTION

This invention relates to a method for treating inflammation in warm-blooded mammals. In particular, it relates to a method for treating inflammation in mammals which comprises administering a 4-alkylether or 4-alkylthioether derivative of a 2-acylaminothiazole represented by the formula.

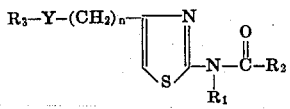

wherein $R_1$ and $R_2$ are hydrogen or $C_1$-$C_6$ alkyl, $R_3$ is $C_1$-$C_6$ alkyl, Y is an oxygen or sulfur atom or a sulfoxide or sulfone group and $n$ is an integer of from 1 to 4; and the pharmaceutically acceptable salts thereof.

The substituted thiazoles useful in the practice of the present invention are prepared by the reaction of a 2-acylamino-4-haloalkylthiazole with an alkali metal alkoxide or an alkyl mercaptan in the presence of a base such as sodium ethoxide. The 2-acylamino-4-haloalkylthiazoles are prepared by reacting an α-haloketone represented by the formula,

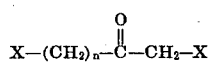

wherein X is halogen and $n$ has the same meaning as previously defined, with a thiourea compound represented by the formula,

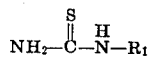

wherein $R_1$ has the same meanings as defined previously, to obtain a 2-amino or 2-alkyl amino-4-haloalkylthiazole represented by the formula,

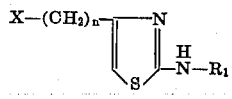

The 2-amino-4-haloalkylthiazole thus obtained is then reacted with the acid halide or anhydride of a $C_2$-$C_7$ carboxylic acid to effect N-acylation and provide the intermediate 2-acylamino-4-haloalkylthiazole.

The compounds represented by the above general formula wherein Y is a sulfoxide or a sulfone group are prepared by the oxidation of the corresponding thioether compound wherein Y is a sulfur atom. The sulfoxides are prepared by reacting the thioether with a near equivalent amount of an oxidizing agent such as a peracid, for example, peracetic acid or perbenzoic acid, while the sulfones are obtained when an excess of an oxidizing agent is reacted with the corresponding thioether.

The substituted thiazole ether compounds described herein are basic compounds capable of forming salts with suitable acids. Accordingly, the pharmaceutically acceptable non-toxic salts of the thiazole ethers of this invention can be prepared by methods commonly employed for the preparation of acid addition salts.

The 2-acylamino-4-alkoxylalkyl (or alkylthioalkyl)thiazoles and the pharmaceutically acceptable salts thereof described herein are useful anti-inflammatory agents in that they alleviate the effects of inflammation in mammals when administered either orally or parenterally at a dose of between about 10 and 450 mg./kg. body weight per day.

DETAILED DESCRIPTION

The thiazole ether compounds useful in the practice of the present invention are represented by the following formula.

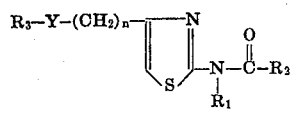

wherein $R_1$ and $R_2$ are hydrogen or $C_1$-$C_6$ alkyl, $R_3$ is $C_1$-$C_6$-alkyl, Y is an oxygen or sulfur atom or a sulfoxide or sulfone group and $n$ is an integer of from 1 to 4; and the pharmaceutically acceptable salts thereof.

The term $C_1$-$C_6$ alkyl, as employed herein, refers to the straight and branched alkyl hydrocarbon chains such as methyl, ethyl, isopropyl, n-butyl, iso-butyl, n-amyl, sec-amyl, n-hexyl and the like.

The term pharmaceutically acceptable salt refers to the non-toxic acid addition salts formed with suitable inorganic acids such as hydrochloric acid, sulfuric acid and phosphoric acid, and suitable organic mono and polycarboxylic acids such as acetic acid, butyric acid, citric acid, maleic acid, succinic acid, malic acid, benzoic acid, phthalic acid, palmitic acid, pimelic acid, and the like and the organic sulfonic acids such as methanesulfonic acid, p-toluenesulfonic acid, naphthalenesulfonic acid and the like.

As previously mentioned, the thiazole ether derivatives described herein are prepared by the reaction of a 2-acylamino-4-haloalkylthiazole with an alkali metal alkoxide or an alkyl mercaptan in the presence of a base such as sodium ethoxide. The following equation illustrates the above described reaction.

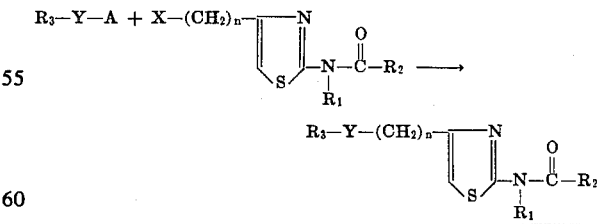

In the above equation $R_1$, $R_2$, $R_3$, Y and $n$ have the same meanings as described above, X is halogen preferably chloro or bromo and A is an alkali metal cation such as the lithium, sodium or potassium cation.

The reaction described above, wherein Y is an oxygen atom, is carried out by adding a solution of the 2-acylamino-4-haloalkylthiazole in a suitable solvent such as ethanol, methanol or isopropanol to a solution of the alkali metal alkoxide in the corresponding alcohol or other suitable solvent. For example, when $R_3$ is ethyl and $n$ is 1 the 2-acylamino-4-halomethylthiazole is dissolved in a convenient volume of ethanol and the solution is added to an ethanol solution of sodium ethoxide. The reaction mixture is then heated at the reflux temperature for about 1 to 4 hours and thereafter evaporated to dryness. The residual reaction product mixture is crystallized from a suitable solvent such as ethanol to yield the purified reaction product, a 2-acylamino-4-ethoxymethylthiazole.

When in the above equation Y is a sulfur atom, the reaction is carried out in the following manner. To an ethanolic solution of sodium or potassium ethoxide is added a solution of the desired alkyl mercaptan in ethanol. An ethanolic solution of the desired 2-acylamino-4-haloalkylthiazole is then added. The reaction mixture is heated at the reflux temperature for about 3 hours and then evaporated to dryness. Crystallization of the residue affords the 2-acylamino-4-alkylthioalkylthiazole.

The 2-acylamino-4-haloalkylthiazoles are prepared according to methods generally employed and understood by those skilled in the art of synthetic organic chemistry. For example, thiourea or a $C_1$-$C_6$-alkyl substituted thiourea is reacted with an $\alpha$-halo ketone represented by the formula

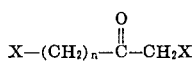

wherein X is halogen, preferably chloro or bromo, and $n$ has the same meaning as assigned previously, to yield respectively a 2-amino-4-haloalkylthiazole or a 2-$C_1$-$C_6$-alkylamino-4-haloalkylthiazole. The 2-aminothiazole thus obtained is then reacted with either the acyl halide or anhydride of a $C_2$-$C_7$ carboxylic acid to yield the 2-acylamino-4-haloalkylthiazole. The acylated reaction product can then be reacted with an alkali metal alkoxide, or an alkyl mercaptan in the presence of a base such as sodium ethoxide in ethanol, to provide respectively an ether or thioether compound of the invention as previously described.

The compounds of the invention wherein Y is a sulfoxide or a sulfone group are prepared by the oxidation of the corresponding thioether wherein Y is a sulfur atom. The oxidation is carried out by reacting the 2-acylamino-4-alkylthioalkylthiazole with a peracid such as peracetic acid, perbenzoic acid, m-chloroperbenzoic acid or other commonly employed peracid in an inert solvent such as acetic acid or chloroform. When the oxidation is controlled by reacting one equivalent of the oxidizing agent with the thioether, the corresponding sulfoxide is obtained. When two equivalents or preferably a large excess of the oxidizing agent is employed, the corresponding sulfone is obtained.

Alternatively the compounds useful in the practice of this invention can be prepared by the following general method. An acyl chloride of the formula

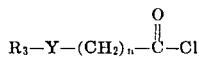

wherein $R_3$ and $n$ have the same meanings as defined above and Y is an oxygen or sulfur atom, is reacted with diazomethane and the intermediate product is reacted with hydrogen chloride to provide an $\alpha$-chloroketone of the formula

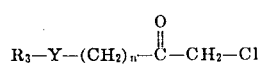

The $\alpha$-chloroketone is thereafter reacted with thiourea or a $C_1$-$C_6$-alkyl substituted thiourea to yield the corresponding 2-amino or 2-alkylaminothiazole of the formula

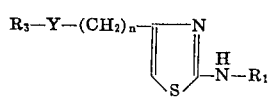

Acylation of a compound represented by the above formula with a $C_2$-$C_7$ alkyl carboxylic acid anhydride or a $C_2$-$C_7$ carboxylic acid chloride or bromide provides a compound useful in the present method.

As previously mentioned the 2-acylamino-4-alkoxyalkylthiazoles and the 2-acylamino-4-alkylthioalkylthiazoles and the sulfoxides and sulfones derived therefrom are basic compounds capable of forming salts with suitable acids. The salts are prepared by the commonly employed methods for the preparation of acid addition salts. For example, a solution of the thiazole compound in ether is treated with hydrogen chloride to form the hydrochloride salt which forms as a precipitate. Likewise an ethanol solution of the thiazole ether compound can be treated with an ethanolic solution of an organic carboxylic acid or sulfonic acid to form the carboxylate or tosylate salt.

The following compounds are illustrative of those which can be employed in the present method.

2-acetamido-4-(methoxymethyl)thiazole
2-acetamido-4-(methylthiomethyl)thiazole
2-acetamido-4-(ethoxymethyl)thiazole
2-propionamido-4-(methoxyethyl)thiazole
2-acetamido-4-(n-propoxyethyl)thiazole
2-n-hexamido-4-(methoxypropyl)thiazole
(2-n-butyramido-4-thiazolylmethyl)methyl sulfoxide
2-acetamido-4-(n-butylthiomethyl)thiazole
2-propionamido-4-(isopropoxybutyl)thiazole
(2-acetamido-4-thiazolylethyl)ethyl sulfone
(2-butyramido-4-thiazolylmethyl)butyl sulfone
(2-acetamido-4-thiazolylbutyl)methyl sulfoxide
2-pentamido-4-(n-butoxymethyl)thiazole
2-(N-acetylmethylamino)-4-(methoxymethyl)thiazole hydrochloride
2-(N-acetylethylamino)-4-(methylthioethyl)thiazole
2-(N-propionyl-n-hexylamino)-4-(ethoxyethyl)thiazole
2-(N-butyryl-sec-amylamino)-4-(n-propylthiomethyl)thiazole
2-(N-acetylmethylamino)-4-(ethoxyethyl)thiazole hydrobromide
2-acetamido-4-(n-hexylthiomethyl)thiazole
[2-(N-propionylmethylamino)-4-thiazolylmethyl]n-propyl sulfoxide
2-acetamido-4-(methylthiobutyl)thiazole The 2-acylaminothiazole ethers, thioethers, sulfoxides and sulfones of this invention possess anti-inflammatory activity and are useful for alleviating the effects of inflammation in mammals. The compounds described herein are effective in alleviating the effects of inflammation, such as soreness, pain, fever, and tenderness when administered parenterally or orally at a dose of from about 10 to 450 mg./kg. of body weight per day. The precise dosage level and mode of administration will vary, depending upon such conditions as the severity and nature of inflammation and the general health of the host.

The thiazole derivatives useful in the present method are relatively non-toxic to mammals. For example, the $LD_{50}$ value in mice is generally greater than 800 mg./kg. i.p. and about 1200 mg./kg. orally.

For parenteral administration a compound of the invention can be prepared in one of the usual pharmaceutical forms such as a sterile aqueous suspension, emulsion, or the like. Likewise, non-aqueous solutions, suspension or emulsions can be prepared in vehicles such as propylene glycol, polyethylene glycol and vegetable oils such as olive oil.

For oral administration, a compound of the invention can be formulated in solid dosage forms such as capsules or tablets as well as in liquid dosage forms, for example aqueous solutions or suspension.

The dose regimen employed for controlling and alleviating the effects of inflammation can be varied. For example, a compound of the invention in a suitable dosage form can be administered if desired as a single daily dose over a number of days. Alternatively, in the case of mild inflammation, administration of smaller multiple doses throughout the day, for instance, three times daily may be desirable.

The following non-limiting examples further illustrate the present invention.

EXAMPLE 1

2-(N-Acetylmethylamino)-4-chloromethylthiazole

A warm solution of 18 g. of 1-methylthiourea in 500 ml. of acetone was added dropwise over 1 hour to a stirred solution of 25.4 g. of 1,3-dichloroacetone in 100 ml. of acetone. The reaction mixture was stirred for 3 hours at ambient temperature and the acetone solvent was then decanted from the precipitated solids. The solid was dissolved in 200 ml. of ethanol and reprecipitated by dilution of the ethanol solution with 400 ml. of petroleum ether (b.p., 60° – 80° C.) The precipitate was filtered to yield 17.5 g. of 2-methylamino-4-chloromethylthiazole as hygroscopic white prisms.

Thirteen and one-half grams of the crystalline precipitate were heated with 40 ml. of acetic anhydride at a temperature of 100° C. for 1.5 hours and the excess anhydride was removed by evaporation in vacuo. The residue was crystallized from ethanol to yield 7.3 g. of 2-(N-acetylmethylamino)-4-chloromethylthiazole as white plates melting at about 140°–141° C.

Elemental Analysis For $C_7H_9ClN_2OS$

Calculated:
C, 41.1; H, 4.4; n, 13.7
Found:
C, 41.0; H, 3.9; N, 13.9

EXAMPLE 2

Following the procedures described by Example 1, the following 2-acylamino-4-haloalkylthiazoles are prepared with the indicated reactants.

2-acetamido-4-chloromethylthiazole is prepared by the reaction of 1,3-dichloroacetone with thiourea and the reaction product is acylated with acetic anhydride.

2-acetamido-4-chloroethylthiazole is prepared with 1,4-dichloro-2-butanone and thiourea and the reaction product is acylated with acetic anhydride.

2-(N-butyrylethylamino)-4-chloromethylthiazole is prepared with 1,3-dichloroacetone and 1-ethylthiourea and the reaction product is acylated with butyric anhydride.

2-propionamido-4-chloropropylthiazole is prepared with 1,5-dichloro-2-pentanone and thiourea and the reaction product 2-amino-4-(3-chloropropyl)thiazole is acylated with propionic anhydride.

EXAMPLE 3

2-Acetamido-4-(methylthiomethyl)thiazole

A solution of 1.15 g. of sodium in 100 ml. of ethanol was saturated with methylmercaptan. To this solution were added 9.5 g. of 2-acetamido-4-chloromethylthiazole and the mixture was heated at the reflux temperature for 3 hours. The solvent and excess methyl mercaptan were evaporated and the solid residue was crystallized from fresh ethanol to yield 4.1 g. of 2-acetamido-4-(methylthiomethyl)thiazole melting at about 120°–122° C.

Elemental Analysis For $C_7H_{10}N_2OS_2$

Calculated:
C, 41.6; H, 4.95; N, 13.85
Found:
C, 41.76; H, 5.08; N, 13.92

EXAMPLE 4

2-Acetamido-4-(ethylthiomethyl)thiazole

To a solution of 1.15 g. of sodium in 50 ml. of ethanol were added 3.1 g. of ethanethiol. To this solution was added a solution of 9.5 g. of 2-acetamido-4-chloromethylthiazole in 50 ml. of ethanol. The reaction mixture was then heated at the reflux temperature for 3 hours. The reaction mixture was evaporated in vacuo to remove the ethanol and yield an oily residue. The residue was purified and obtained crystalline by chromatography over silica gel with chloroform as the eluant. Evaporation of the eluate afforded a solid residue which was crystallized from ethanol-water to yield 4 g. of 2-acetamido-4-(ethylthiomethyl)-thiazole melting at about 115°–117° C.

Elemental Analysis For $C_8H_{12}N_2OS_2$

Calculated:
C, 44.41; H, 5.59; N, 12.95
Found:
C, 44.73; H, 5.61; N, 13.10

EXAMPLE 5

A solution of 3.4 g. of 2-acetamido-4-(methylthiomethyl)-thiazole, prepared as described in Example 3, in 50 ml. of glacial acetic acid containing 2.35 ml. of 30 percent hydrogen peroxide was allowed to stand at room temperature for 48 hours. The acetic acid was evaporated under reduced pressure to yield an oily residue which crystallized on trituration with ether. The crystalline residue was recrystallized from ethanol-petroleum ether to yield 2.2 g. of methyl(2-acetamido-4-thiazolymethyl)sulfoxide melting at about 159°–161° C.

Elemental Analysis For $C_7H_{10}N_2O_2S_2$

Calculated:
C, 38.5; H, 4.6; N, 12.8
Found:
C, 38.9; H, 4.9; N, 12.8

EXAMPLE 6

Following the procedures as described by Example 5, n-propyl(2-propionamido-4-thiazolylmethyl)sulfoxide is prepared.

EXAMPLE 7

Following the procedures as described by Example 5, ethyl[2-(N-acetylmethylamino)-4-thiazolylethyl]sulfoxide is prepared.

EXAMPLE 8

To a solution of sodium (2.3 g., 100 m. moles) in ethanol (150 ml.) was added 2-mercaptopropane (8.0 g., 105 m. moles). A solution of 2-acetamido-4-chloromethyl thiazole (19 g., 100 m. moles) in ethanol (100 ml.) was then added and the mixture stirred at room temperature for 3 hours. The filtered solution was evaporated under recuced pressure at 40° C. The produce was crystallized from ethanol/water to give 16 g. of 2-acetamido-4-(isopropylthiomethyl)thiazole, m.p. 145°–146° C.

Elemental Analysis For $C_9H_{14}N_2OS_2$

Calculated:
C, 46.92; H, 6.13; N, 12.16
Found:
C, 47.16; H, 6.23; N, 12.40

EXAMPLE 9

To a solution of 2-acetamido-4-(ethylthiomethyl)thiazole (6 g., 27.8 m. moles) in methanol (50 ml.) was added a solution of sodium periodate (6.5 g., 30.4 m. moles) in water (20 ml.). The resulting percipitate of sodium iodate was filtered off and the filtrate was evaporated at 40° C. under reduced pressure. Purification by column chromatography followed by recrystallization from ethanol/petroleum ether produced 1.2 g. of ethyl-(2-acetamido-4-thiazolylmethyl)sulphoxide, m.p. 140°–141° C.

Elemental Analysis For $C_8H_{12}N_2S_2O_2$

Calculated:

C, 41.36; H, 5.21; N, 12.06
Found:
C, 41.17; H, 5.44; N, 11.80

EXAMPLE 10

To a solution of 2-acetamido-4-(ethylthiomethyl)thiazole (2.75 g., 12.6 m. moles) in methanol (50 ml.) was added, with stirring at 0° C., m-chloroperbenzoic (6 g., 34.8 m. moles). After stirring at 10° C. for 3 hours, the mixture was kept overnight at room temperature. The precipitated solid was recrystallized from ethanol/petroleum ether to give 2 g. of ethyl-(2-acetamido-4-thiazolylmethyl)sulfone, m.p. 185°–186 °C.

Elemental Analysis For $C_8H_{12}N_2O_3S_2$

Calculated:
C, 38.69; H, 4.87; N, 11.28
Found:
C, 38.88; H, 4.84; N, 11.14

EXAMPLE 11

To a solution of diazomethane in ether, made by the standard method from N-methyl-N-nitroso-p-toluene sulphonamide (10 g.), was added 2-acetamido-4-(hydroxymethyl)thiazole (2.8 g., 16.3 m. moles), made by careful hydrolysis of 2-acetamido-4-(chloromethyl)thiazole at pH 6.5. A drop of boron trifluoride etherate was added, producing a brisk effervescence. After stirring at room temperature overnight, the excess diazomethane was destroyed with acetic acid. The resulting product was triturated with ethanol to give a small amount of yellow solid and an oil. The oil was purified by column chromatography on silica gel to give 700 mg. of 2-acetamido-4-(methoxymethyl)thiazole, m.p. 84°–85° C.

Elemental Analysis For $C_7H_{10}N_2O_2S$

Calculated:
C, 45.14; H, 5.41; N, 15.04
Found:
C, 45.16; H, 5.57; N, 15.01

EXAMPLE 12

A methanolic solution of 2-acetamido-4-(methylthiomethyl)thiazole (5 g., 24.8 m. moles) was treated with m-chloroperbenzoic acid (11 g., 64 m. moles) in the same way as in Example 10, to give 2.5 g. of methyl-(2-acetamido-4-thiazolylmethyl)sulfone, m. p. 205°–206° C.

Elemental analysis for $C_7H_{10}N_2O_3S_2$

Calculated:
C, 35.88; H, 4.30; N, 11.96

Found:
C, 36.07; H, 4.55; N, 12.07

EXAMPLE 13

To a solution of sodium (2.3 g., 100 m. moles) in ethanol (100 ml.) was added n-propyl mercaptan (8 g., 105 m. moles) and then, with stirring, 2-acetamido-4-chloromethyl thiazole (19 g., 100 m. moles). The reaction was carried out as in Example 8 to give 14.7 g. of 2-acetamido-4-(n-propylthiomethyl)thiazole, m.p. 96°–97° C.

Elemental Analysis For $C_9H_{14}N_2OS_2$

Calculated:
C, 46.92; H, 6.13; N, 12.16
Found:
C, 47.08; H, 6.11; N, 12.31

EXAMPLE 14

A solution of 2-acetamido-4-(isopropylthiomethyl)thiazole (3.9 g., 17 m. moles) in methanol (40 ml.) was treated with sodium periodate (3.62 g., 17 m. moles) in water (10 ml.), in the same way as in Example 9, to give, after purification by column chromatography, 1.8 g. of isopropyl-(2-acetamido-4-thiazolylmethyl)sulphoxide, m.p. 178°–179° C.

Elemental Analysis For $C_9H_{14}N_2O_2S_2$

Calculated:
C, 43.88; H, 5.73; N, 11.37
Found:
C, 43.64; H, 5.76; N, 11.34

I claim:
1. The method of treating inflammation in a mammal in need of said treatment which comprises administering to said mammal between 10 mg./kg. to 450 mg./kg. of body weight daily of a compound of the formula:

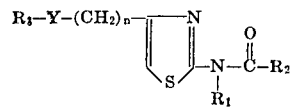

wherein $R_1$ and $R_2$ are hydrogen or $C_1$–$C_6$ alkyl, $R_3$ is $C_1$–$C_6$ alkyl, Y is oxygen atom, sulfur atom, sulfoxide or sulfone and $n$ is an integer of from 1 to 4; or the pharmaceutically acceptable salts thereof.

2. The method of claim 1 wherein the compound is 2-acetamido-4-(methylthiomethyl)thiazole.

3. The method of claim 1 wherein the compound is 2-acetamido-4-(ethylthiomethyl)thiazole.

4. The method of claim 1 wherein the compound is methyl(2-acetamido-4-thiazolylmethyl) sulfoxide.

* * * * *